(12) United States Patent
Yoshida et al.

(10) Patent No.: US 7,168,812 B2
(45) Date of Patent: Jan. 30, 2007

(54) PROJECTOR

(75) Inventors: Kanji Yoshida, Hotaka-machi (JP); Joji Karasawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 188 days.

(21) Appl. No.: 10/980,330

(22) Filed: Nov. 4, 2004

(65) Prior Publication Data

US 2005/0128439 A1 Jun. 16, 2005

(30) Foreign Application Priority Data

Nov. 10, 2003 (JP) ............................... 2003-379912

(51) Int. Cl.
*G03B 21/14* (2006.01)
*G03B 21/26* (2006.01)

(52) U.S. Cl. .......................................... 353/84; 353/30
(58) Field of Classification Search .................. 353/30, 353/31, 34, 84
See application file for complete search history.

(56) References Cited

U.S. PATENT DOCUMENTS

2004/0114219 A1* 6/2004 Richardson ................. 359/368

FOREIGN PATENT DOCUMENTS

JP A 10-311968 11/1998

* cited by examiner

*Primary Examiner*—Rodney Fuller
(74) *Attorney, Agent, or Firm*—Oliff & Berridge PLC

(57) ABSTRACT

To provide a projector that hardly causes deterioration of an image resulted from stray light. A neutral density filter, of which posture can be fine-adjusted by a posture regulating mechanism, is placed in a space between a second dichroic mirror and a liquid crystal light valve. Thus, it is possible to remove stray light, corresponding to condensed light resulted from multi-pass through a field lens or the like, to the outside of a light path by merely tilting the neutral density filter adequately. It is thus possible to project an image having homogeneous brightness (illuminance at the white level) across the entire screen, which in turn makes it possible to project an image having no irregularities in color across the entire screen.

14 Claims, 9 Drawing Sheets

PROJECTOR

BACKGROUND OF THE INVENTION

1. Field of Invention

Exemplary aspects of the present invention relate to a projector that projects an image with the use of a liquid crystal panel or any other display apparatus.

2. Description of Related Art

A related art projector achieves desired white balance, for example, by decreasing a quantity of green light through the use of a neutral density filter placed on a light path for green light to absorb or reflect green light (See JP-A-10-311968.

SUMMARY OF THE INVENTION

With the projector as described above, however, in a case where one wishes to fine-adjust the transmittance of the neutral density filter after assembly, there is no other way but to replace the neutral density filter or the like.

It is possible to replace the neutral density filter with a neutral density filter of a reflective type. In this case, however, reflection light may generate stray light, which gives rise to irregularities in luminance.

Exemplary aspects of the invention, therefore, provide a projector that can be readily fine-adjusted after assembly and hardly causes deterioration of an image resulted from stray light.

In order to address and/or achieve the above and/or other objects, a projector of a first exemplary aspect of the invention includes: (a) an illuminating device to emit illumination light; (b) a light modulating device illuminated by the illumination light from the illuminating device; (c) a projection optical system to project an image of light from the light modulating device; (d) a neutral density filter of a reflective type, placed in a preceding stage of the light modulating device, to attenuate intensity of the illumination light that goes incident on the light modulating device; and (e) a holding device to hold the neutral density filter with a tilt of a certain angle with respect to an optical axis.

In the projector, because the holding device holds the neutral density filter of a reflective type to attenuate intensity of illumination light that goes incident on the light modulating device with a tilt of a certain angle with respect to the optical axis, reflection light on the surface of the neutral density filter deviates from the light path. It is thus possible to reduce the likelihood or prevent stray light form being generated by such reflection, and hence to reduce the likelihood or prevent the occurrence of irregularities in luminance in a projection image.

Even in a case where light is condensed unexpectedly due to return light from lens elements or the like placed on the light path up to the projection optical system, such condensed light due to stray light is guided to the outside of the optical path when reflected on the neutral density filter that is held in a tilted state. It is thus possible to reduce the likelihood or prevent the occurrence of stray light due to return light resulting from multi-reflection via the lens elements or the like, which in turn makes it possible to reduce the likelihood or prevent inhomogeneous illumination, specifically, the occurrence of irregularities in luminance.

By using a neutral density filter of a reflective type, it is possible to reduce or prevent heat accumulation in the neutral density filter. Hence, because the characteristic of the neutral density filter can be maintained in a stable manner over a long period, it is possible to form a projection image having few irregularities in luminance.

A projector of a second exemplary aspect of the invention includes: (a) an illuminating device to emit beams of illumination light of respective colors; (b) light modulating devices of respective colors illuminated by the beams of illumination light of respective colors; (c) a light synthesizing member to synthesize images of light of respective colors from the light modulating devices of respective colors to be emitted; (d) a projection optical system to project the images of light having passed through the light synthesizing member; (e) a neutral density filter of a reflective type, the light modulating devices of respective colors, to attenuate intensity of the illumination light that goes incident on the aforementioned at least one light modulating device; and (f) a holding device to hold the neutral density filter with a tilt of a certain angle with respect to an optical axis.

In the projector, because the holding device holds the neutral density filter of a reflective type to attenuate intensity of illumination light that goes incident on at least one of the light modulating devices with a tilt of a certain angle with respect to the optical axis, it is possible to reduce the likelihood or prevent stray light from being generated by reflection on the surface of the neutral density filter, and hence to reduce the likelihood or prevent the occurrence of irregularities in luminance and in color. Even in a case where light is condensed unexpectedly due to return light from lens elements or the like placed on the light path up to the projection optical system, such condensed light due to stray light is guided to the outside of the optical path when reflected on the neutral density filter that is held in a tilted state. It is thus possible to reduce the likelihood or prevent stray light from being generated due to return light from the lens elements or the like, which in turn makes it possible to reduce the likelihood or prevent the occurrence of irregularities in luminance and in color in a projection image. By using a neutral density filter of a reflective type, it is possible to reduce or prevent heat accumulation in the neutral density filter. Hence, because the characteristic of the neutral density filter can be maintained in a stable manner over a long period, it is possible to form a color projection image having few irregularities in luminance.

According to an exemplary aspect of the invention, in the projector, the neutral density filter is of a plate shape. In this case, not only can a homogeneous reduction of light be achieved, but also generation of stray light that converges by reflection on the neutral density filter per se or the like can be reduced or prevented.

According to an exemplary aspect of the invention, the holding device includes an adjusting device to adjust an angle of tilt of the neutral density filter with respect to the optical axis. In this case, it is possible to fine-adjust a direction in which reflection light on the neutral density filter is guided. Hence, not only can the generation of stray light be reduced or prevented in a reliable manner, but also a degree of reduction of light by the neutral density filter can be fine-adjusted.

According to an exemplary aspect of the invention, an angle of tilt of the neutral density filter with respect to the optical axis is 8° or greater. In this case, because stray light can be guided to the outside of the light path in a reliable manner, it is possible to reduce the likelihood or prevent the occurrence of irregularities in luminance and in color in a projection image.

According to an exemplary aspect of the invention, a field lens, placed in a preceding stage of the light modulating device, to regulate an angle of incidence of the illumination light on the light modulating device is further provided, and the neutral density filter is placed in a preceding stage of the field lens. In this case, even in a case where converged light or the like is generated unexpectedly due to return light via the field lens or the like, such converged light can be guided to the outside of the light path, which can in turn make the brightness of a projection image homogeneous in all the portions.

According to an exemplary aspect of the invention, field lenses, respectively placed in preceding stages of the light modulating devices of respective colors, to regulate an angle of incidence of the illumination light on each of the light modulating devices are further provided. The neutral density filter is placed in a preceding stage of at least one of the field lenses. In this case, even in a case where converged light or the like is generated unexpectedly due to return light via the field lens or the like, such converged light can be guided to the outside of the light path. Hence, not only can the brightness of a projection image be made homogeneous in all the portions, but also the occurrence of irregularities in color and inhomogeneity in brightness can be reduced or prevented.

DETAILED DESCRIPTION OF EXEMPLARY EMBODIMENTS

First Exemplary Embodiment

The structure of a projector according a first exemplary embodiment of the invention will now be described with reference to the drawings.

Figure 1:
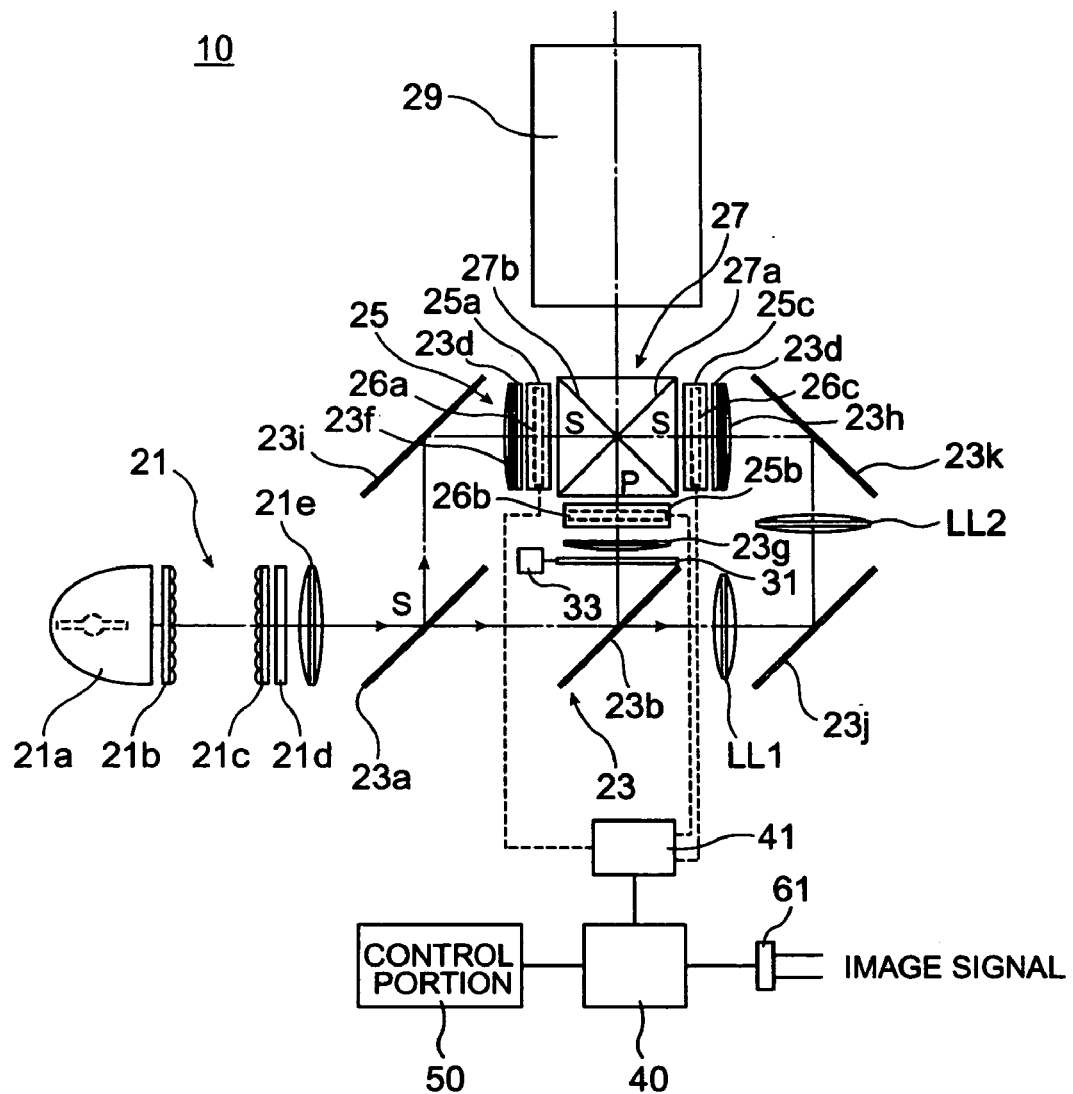
FIG. 1 is a schematic showing the block diagram of a projector according to a first exemplary embodiment.

FIG. 1 is a schematic showing an optical system of the projector of the first exemplary embodiment. The projector 10 includes: a light source device 21 to generate light-exemplary light; a light division optical system 23 to split light-source light from the light source device 21 into beams of light for three colors of RGB; a light modulation portion 25 illuminated by beams of illumination light of respective colors emitted from the light division optical system 23; a cross dichroic prism 27 to synthesize images of light of respective colors from the light modulation portion 25; and a projection lens 29 serving as a projection optical system to project images of light synthesized in the cross dichroic prism 27 onto a screen (not shown). Further, the projector 10 includes an image processing portion 40 to generate driving signals for display devices of respective colors (described below) incorporated in the light modulation portion 25, and a control device 50 to control the overall apparatus systematically by activating the image processing portion 40 or the like as needed.

The light source device 21 includes a light source lamp 21a, a pair of fly's eye optical systems 21b and 21c, a polarization converting member 21d, and a superimposing lens 21e. The light source lamp 21a includes, for example, a high-pressure mercury lamp and is provided with a concave mirror to collimate light-source light. The pair of fly's eye optical systems 21b and 21c include a plurality of element lenses placed in a matrix fashion. These element lenses split light-source light from the light source lamp 21a to be condensed or dispersed independently. The polarization converting member 21d converts light-source light emitted from the fly's eye 21c, for example, to S-polarized light components alone, which are perpendicular to the sheet surface of FIG. 1, and feeds them to an optical system in the following stage. The superimposing lens 21e converges illumination light as a whole that has passed through the polarization converting member 21d as needed, and thereby enables superimposed illumination by the display devices of respective colors.

Specifically, illumination light, having passed through both fly's eye optical systems 21b and 21c and the superimposing lens 21e, passes through the light division optical system 23 and thereby achieves homogeneous, superimposed illumination on display devices 25a, 25b, and 25c of respective colors provided to the light modulation portion 25, which will be described in detail below.

The light division optical system 23 includes first and second dichroic mirrors 23a and 23b, three field lenses 23f, 23g, and 23h, and reflection mirrors 23i, 23j, and 23k, and forms an illuminating device together with the light source device 21. Of three colors of RGB, the first dichroic mirror 23a reflects R light and transmits G light and B light. Of two colors of incident light, that is, G and B light, the second dichroic mirror 23b reflects G light and transmits B light. In the light division optical system 23, R light reflected on the first dichroic mirror 23a passes through the reflection mirror 23i, and then goes incident on the field lens 23f used to regulate an angle of incidence in the form of S-polarized light, after which it is converted to P-polarized light from S-polarized light by passing through a λ/2 phase difference plate 23d. Also, G light, having passed through the first dichroic mirror 23a and reflected on the second dichroic mirror 23b, passes through a neutral density filter 31 of a parallel plate shape, and then goes incident on the field lens 23g used to regulate an angle of incidence. Further, B light, having passed through the second dichroic mirror 23b, passes through relay lenses LL1 and LL2 to compensate a difference of optical paths and the reflection mirrors 23j and 23k, and then goes incident on the field lens 23h used to regulate an angle of incidence in the form of S-polarized light, after which it is converted to P-polarized light from S-polarized light by passing through the λ/2 phase difference plate 23d. Herein, R light, B light, and G light are composed of different beams of polarized light. It should be appreciated, however, that R light, B light, and G light may be composed of the same beams of polarized light.

The neutral density filter 31 includes a parallel plate made of glass, on one surface of which is uniformly formed a dielectric multi-layer film, and has desired transmittance with respect to G light. Because the neutral density filter 31 is a filter of a reflective type using a dielectric multi-layer film, it does not absorb light when reducing light. Hence, the temperature rises little, but unwanted reflection light is generated as a by-product. Although it will be described in detail below, such by-productive reflection light can be released to the outside of the light path by tilting the neutral density filter 31 by a minute angle with respect to the optical axis, which can reduce or prevent the reflection light from resulting in stray light. An angle of tilt of the neutral density filter 31 can be fine-adjusted by a posture regulating mechanism 33 serving as a holding device. It is thus possible to fine-adjust a degree of reduction of light by the neutral density filter 31.

The display devices 25a, 25b, and 25c of respective colors that form the light modulation portion 25 include three liquid crystal light valves 26a, 26b, and 26c, respectively, each serving as a light modulation device. R light, reflected on the first dichroic mirror 23a, goes incident on the liquid crystal light valve 26a provided to the R display device 25a via the field lens 23f and the λ/2 phase difference plate 23d. G light, having passed through the first dichroic mirror 23a and reflected on the second dichroic mirror 23b, goes incident on the liquid crystal light valve 26b provided to the G display device 25b via the posture regulating mechanism 33 and the field lens 23g. B light, having passed through both the first and second dichroic mirrors 23a and 23b, goes incident on the liquid crystal light valve 26c provided to the B display device 25c via the field lens 23h and the λ/2 phase difference plate 23d. Each of the liquid crystal light valves 26a through 26c is a display device of a spatial light modulation type that modulates a spatial intensity distribution of incident illumination light. Beams of illumination light of three colors that come incident on the liquid crystal light valves 26a through 26c, respectively, are modulated according to a driving signal or an image signal inputted as an electric signal to each of the liquid crystal light valves 26a through 26c.

The cross dichroic prism 27 is a light synthesizing member, having inside a dielectric multi-layer film 27a to reflect R light and a dielectric multi-layer film 27b to reflect B light that intersect with each other at right angles. R light from the R display device 25a is reflected on the dielectric multi-layer film 27a to be emitted to the right in a travel direction. G light from the G display device 25b is emitted to travel straight via the dielectric multi-layer films 27a and 27b. B light from the B display device 25c is reflected on the dielectric multi-layer film 27b to be emitted to the left in a travel direction. In this instance, by forming images of light emitted from the R and B display devices 25a and 25c in the form of S-polarized light that oscillates in a direction perpendicular to the light incident surface that is perpendicular to both the dielectric multi-layer films 27a and 27b, and forming an image of light emitted from the G display device 25b in the form of P-polarized light that oscillates within the light incident surface, not only can the reflection efficiency of R and B light by the dielectric multi-layer films 27a and 27b be increased, but also the transmission efficiency of G light by both the dielectric multi-layer films 27a and 27b can be increased.

The image processing portion 40 operates as per instructions from the control device 50 that systematically controls the operations of the overall projector 10, to which digital image signals from a personal computer and video image signals from a video player or the like are inputted via a connector 61. The image processing portion 40 converts these image signals into control signals to activate the respective liquid crystal light valves 26a through 26c as needed, and outputs the control signals to a liquid crystal driving portion 41. According to these control signals, the liquid crystal driving portion 41 outputs driving signals needed for pixel-by-pixel display operations by the respective liquid crystal light valves 26a through 26c to each of the liquid crystal light valves 26a through 26c. It is thus possible to form 2-D polarization characteristic distributions, corresponding to luminance of respective colors in a projection image, in the respective liquid crystal light valves 26a through 26c.

Figure 2:
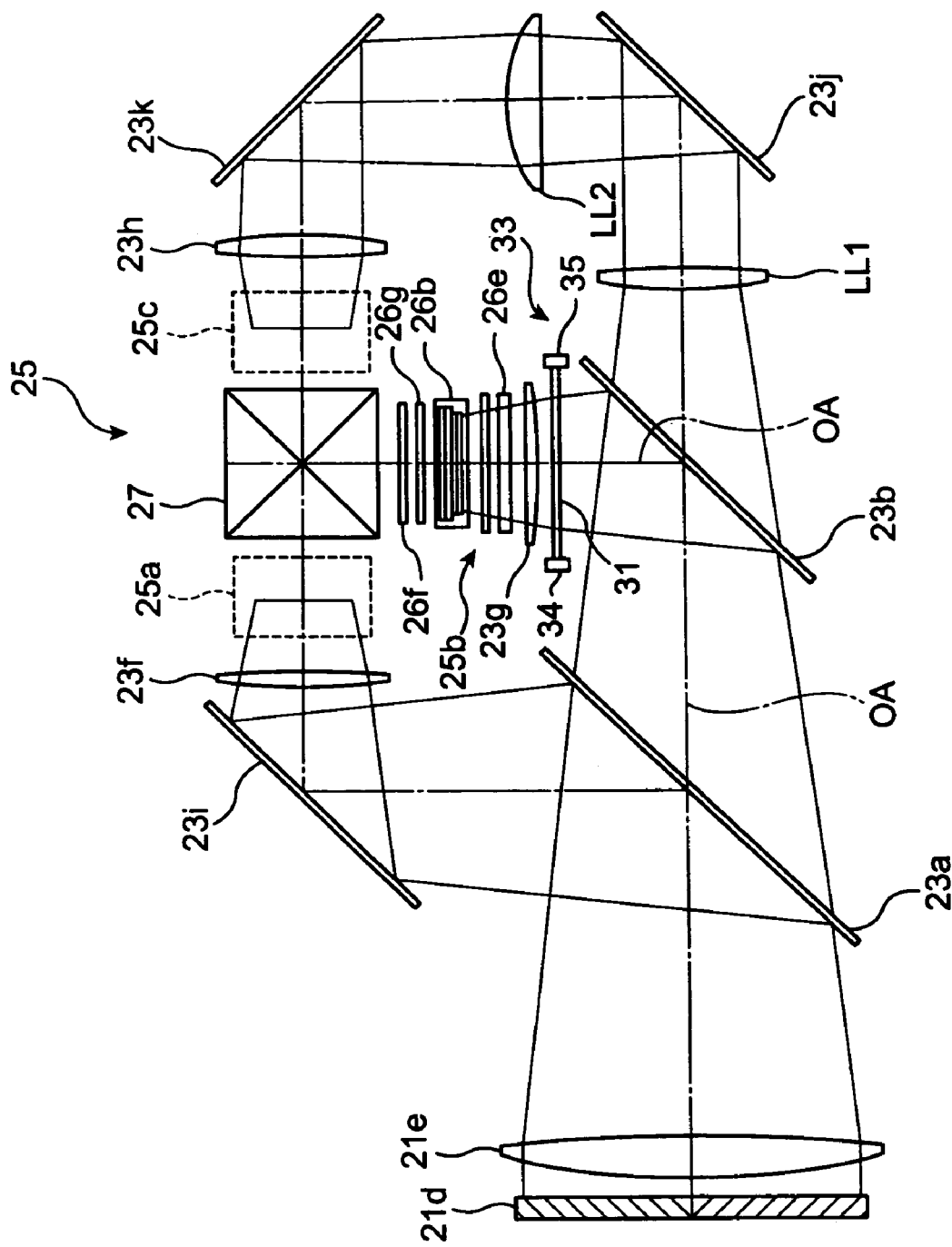
FIG. 2 is a schematic showing the concrete placement of a light modulation portion and optical components on the periphery.

FIG. 2 is a schematic showing the concrete placement of the light modulation portion 25 and optical components on the periphery. For example, in the G display device 25b, a first polarization filter 26e is placed on the light incident side of the liquid crystal light valve 26b so as to oppose the light incident surface, which makes it possible to illuminate exactly the liquid crystal light valve 26b with polarized components in a specific direction (to be specific, S-polarized light). Also, a second polarization filter 26f is placed on the light emission side of the liquid crystal light valve 26b so as to oppose the light emission surface, which makes it possible to read out only polarized components having passed through the liquid crystal light valve 26b, in a direction that intersects with the specific direction at right angles. A optical compensating element is placed in a space between the liquid crystal light valve 26b and the second polarized filter 26f. Hence, when an electric field is formed in the liquid crystal layer, a phase difference remaining on the light incident side and the light emission side is compensated, and the display at the black level is thereby increased. Although it is omitted from the drawing, the R display device 25a and the B display device 25c have the same structure as the G display device 25b except that the λ/2 phase difference plate 23d is additionally interposed.

Figure 3:
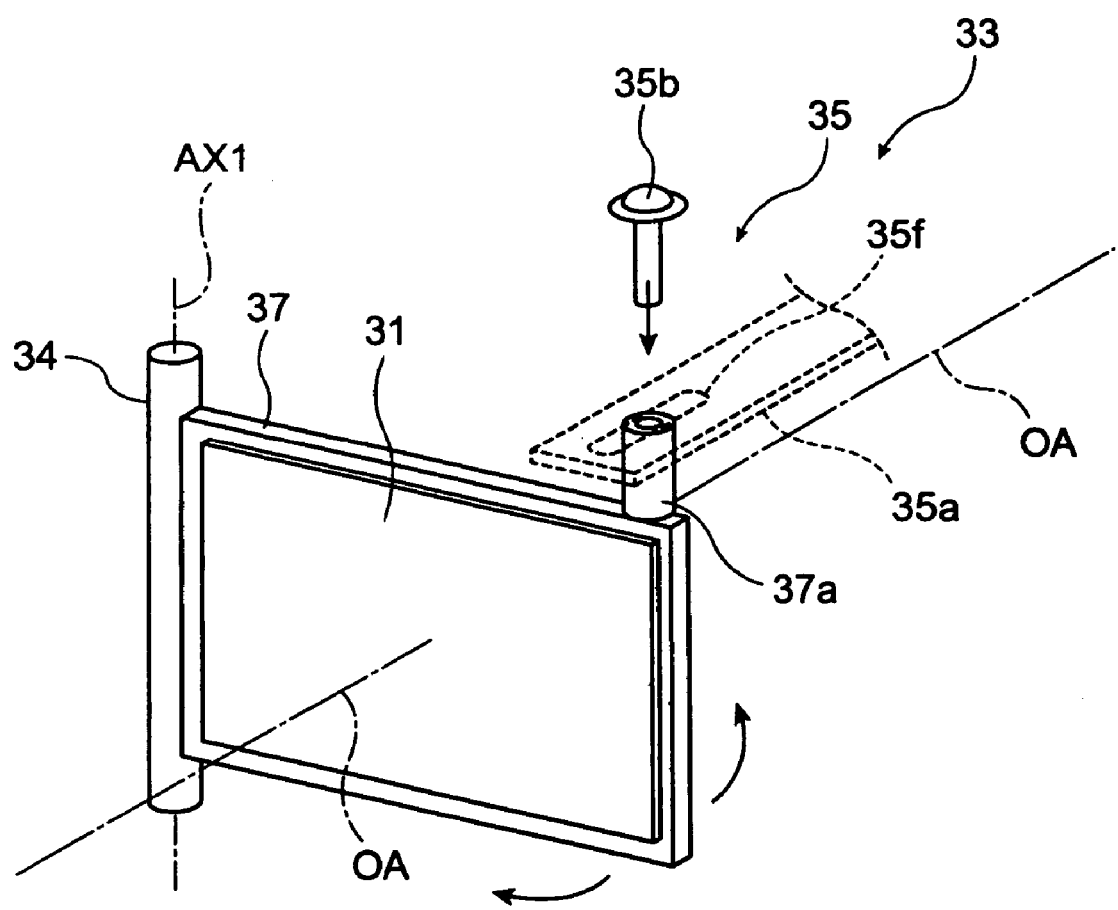
FIG. 3 is a schematic showing the posture regulating mechanism for a neutral density filter.

As has been described with reference to FIG. 1, the neutral density filter 31 is placed in the preceding stage of the field lens 23g on the G light emission side of the second dichroic mirror 23b. A tilting angle of the neutral density filter 31 with respect to the optical axis OA can be adjusted by the posture regulating mechanism 33. The posture regulating mechanism 33 includes a pivoted member 34 to pivotally support the neutral density filter 31, at one end, and a fixing device 35 to fix the neutral density filter 31 at the other end. The neutral density filter 31, held by the posture regulating mechanism 33, is supported by the pivoted member 34, and is in a state tilted, for example, by about 8° with respect to the optical axis OA. An angle of tilt can be fine-adjusted about the angle of 8° by the settings of the fixing device 35. As has been described, by adjusting an angle of tilt of the neutral density filter 31, even in a case where the provided dielectric multi-layer film per se has irregularities in transmittance or in a case where transmittance varies due to aberration, absorption, etc. of the optical system up to the neutral density filter 31, not only can targeted white balance be achieved, but also a high-quality image can be projected by canceling out these irregularities in transmittance FIG. 3 is a schematic showing the posture regulating mechanism 33. The posture regulating mechanism 33 includes the pivoted member 34 to hold a frame 37 that holds the neutral density filter 31 rotatably about an axis AX1 perpendicular to the optical axis OA at the basal, which is the side portion of the frame 37, and the fixing device 35 to fix the tip end on the side of the frame 37 to allow displacement. The latter fixing device 35 includes a stay 35a fixedly attached to an unillustrated main body member on the tip end of the frame 37, and a screw 35b screwed into a female screw member 37a through a long hole 35f provided in the stay 35a. In a state shown in the drawing, the neutral density filter 31 is in a state tilted by about 8° with respect to the optical axis OA. When the screw 35b is screwed into the female screw member 37a and tightened in this state, the stay 35a and the female screw member 37a are fixed to each other, and the frame 37, specifically, the neutral density filter 31, is held while being tilted by about 8° to 15° with respect to the optical axis OA. Conversely, when the screw 35b is loosened from the female screw member 37a, the female screw member 37a is allowed to move with respect to the stay 35a, and the frame 37, specifically, the neutral density filter 31, rotates about the axis AX1 as the axis of rotation. It is thus possible to change an angle of tilt of the neutral density filter 31 with respect to the optical axis OA in a range of angles from 8° to 15°. By screwing the screw 35b again into the female screw member 37a to be tightened with the angle of tilt being changed as described above, it is possible to hold the frame 37, specifically, the neutral density filter 31, while it is tilted by an arbitrary angle of tilt, α, with respect to the optical axis OA.

Figure 4:
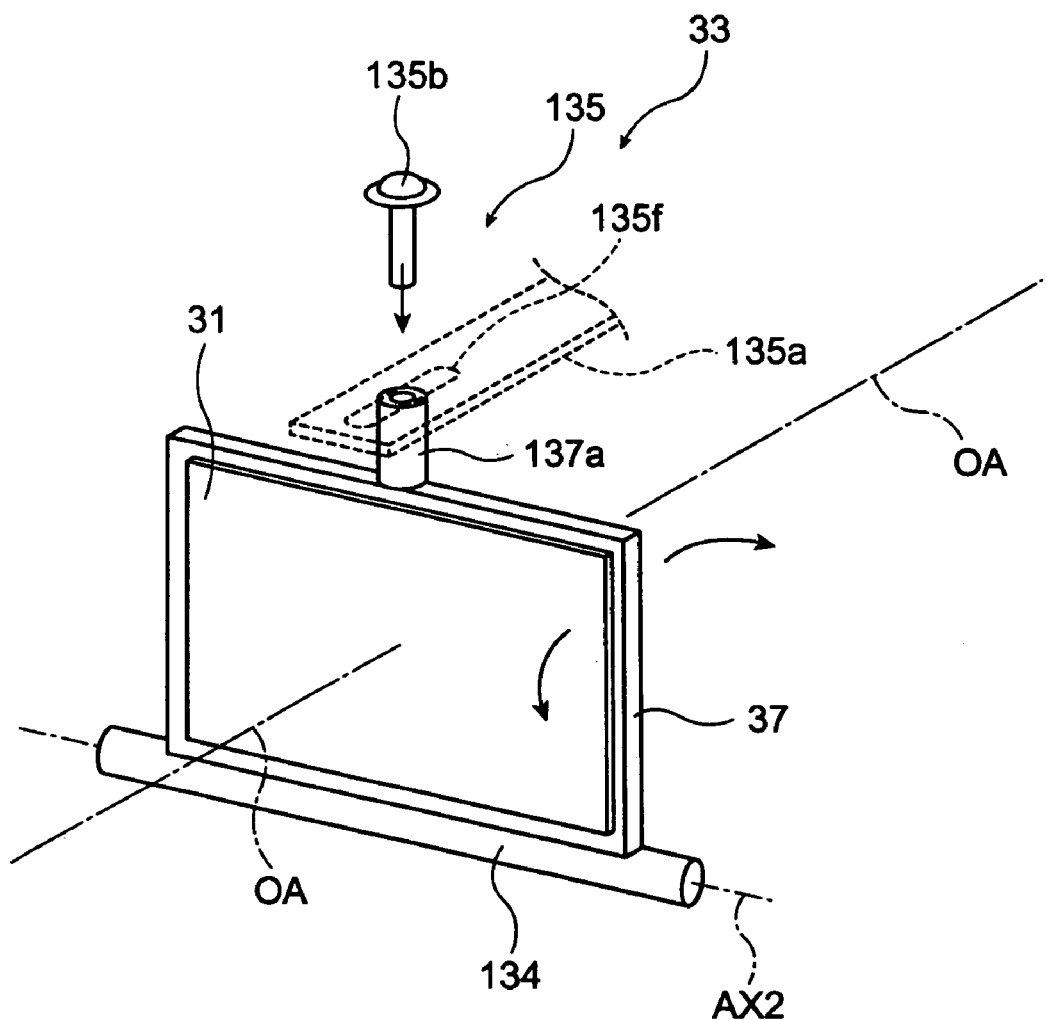
FIG. 4 is a schematic showing the modification of the posture regulating mechanism of FIG. 3.

FIG. 4 is a schematic showing the modification of the posture regulating mechanism 33. The posture regulating mechanism 33 includes a pivoted member 134 to support the frame 37 that holds the neutral density filter 31 rotatably about an axis AX2 perpendicular to the optical axis OA at the basal, which is the bottom portion of the frame 37, and a fixing device 135 to fix the tip end on the upper side of the frame 37 to allow displacement. The latter fixing device 135 includes a stay 135a fixedly attached to an unillustrated main body member at the tip end of the frame 37, and a screw 135b screwed into a female screw member 137a through a long hole 135f provided in the stay 135a.

In a state shown in the drawing, the neutral density filter 31 is in a state tilted by about 8° with respect to the optical axis OA. When the screw 135b is screwed into the female screw member 137a and tightened in this state, the stay 135a and the female screw member 137a are fixed to each other, and the frame 37, specifically, the neutral density filter 31, is held while being tilted by about 8° to 15° with respect to the optical axis OA. When the screw 135b is loosened from the female screw member 137a, the female screw member 137a is allowed to move with respect to the stay 135a, and the frame 37, that is, the neutral density filter 31, rotates about the axis AX2 as the axis of rotation. It is thus possible to change an angle of tilt of the neutral density filter 31 with respect to the optical axis OA in a range of angles from 8° to 15°. By screwing the screw 135b again into the female screw member 137a to be tightened with the angle of tilt being changed as described above, it is possible to hold the frame 37, specifically, the neutral density filter 31, while it is tilted by an arbitrary angle of tilt, α, with respect to the optical axis OA.

Figure 5:
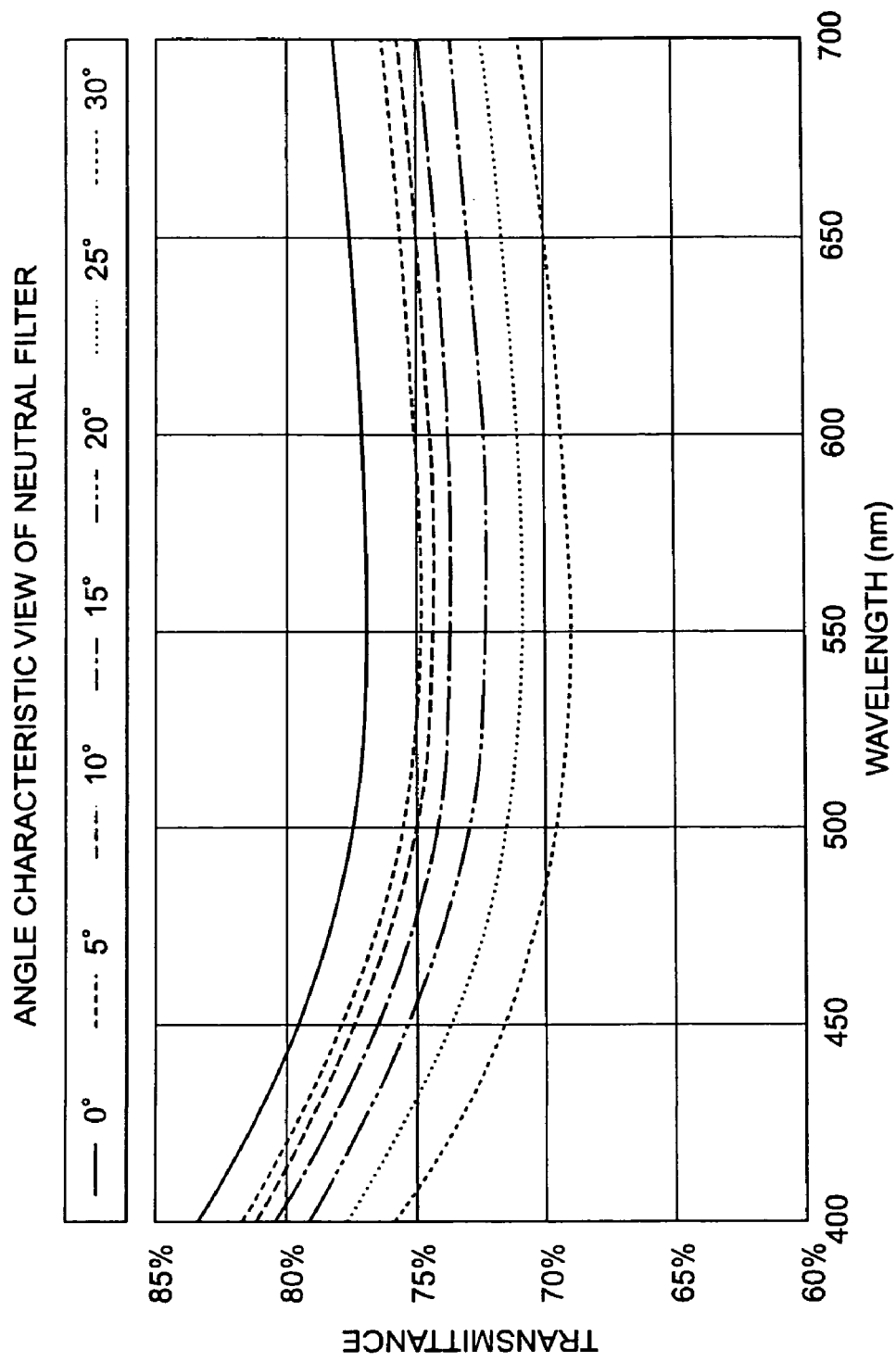
FIG. 5 is a graph of an angle dependency of transmittance of the neutral density filter.

FIG. 5 is a graph to explain the simulation result of angle independency of transmittance of the neutral density filter 31. Herein, the abscissa is used for a wavelength (nm) and the ordinate is used for transmittance (%). It is obvious from the graph that an angle of tilt of the neutral density filter 31 is determined by pre-setting the wavelength and a target light-reducing ratio of illumination light (G light in this exemplary embodiment) passing through the neutral density filter 31. When the projector 10 shown in FIG. 1 and the like is assembled, white balance of an image to be projected onto the screen can be set precisely by fine-adjusting an angle of tilt of the neutral density filter 31 in the final stage of assembly with the use of the posture regulating mechanism 33 shown in FIG. 3 and the like. Table 1 set forth below shows the result when a change in transmittance of the neutral density filter 31 was measured by fine-adjusting an angle of tilt of the neutral density filter 31.

TABLE 1

Experiment Result by Changing Angle of Tilt

| | Angle of Tilt | | | | | | | |
|---|---|---|---|---|---|---|---|---|
| | 0° | 2° | 4° | 6° | 8° | 10° | 12° | 14° |
| Transmittance (center) | 79% | 75% | 73% | 71% | 68% | 67% | 65% | 64% |

It is obvious from the result that when an angle of tilt of the neutral density filter 31 is small (for example, 8° or less), transmittance is decreased markedly with an increase of an angle of tilt. When an angle of tilt of the neutral density filter 31 is large (for example, greater than 8°), a decrease in transmittance associated with an increase of an angle of tilt is lessened. In short, by tilting the neutral density filter 31 by 8° or greater, transmittance can be fine-adjusted with relative ease.

Figure 6:
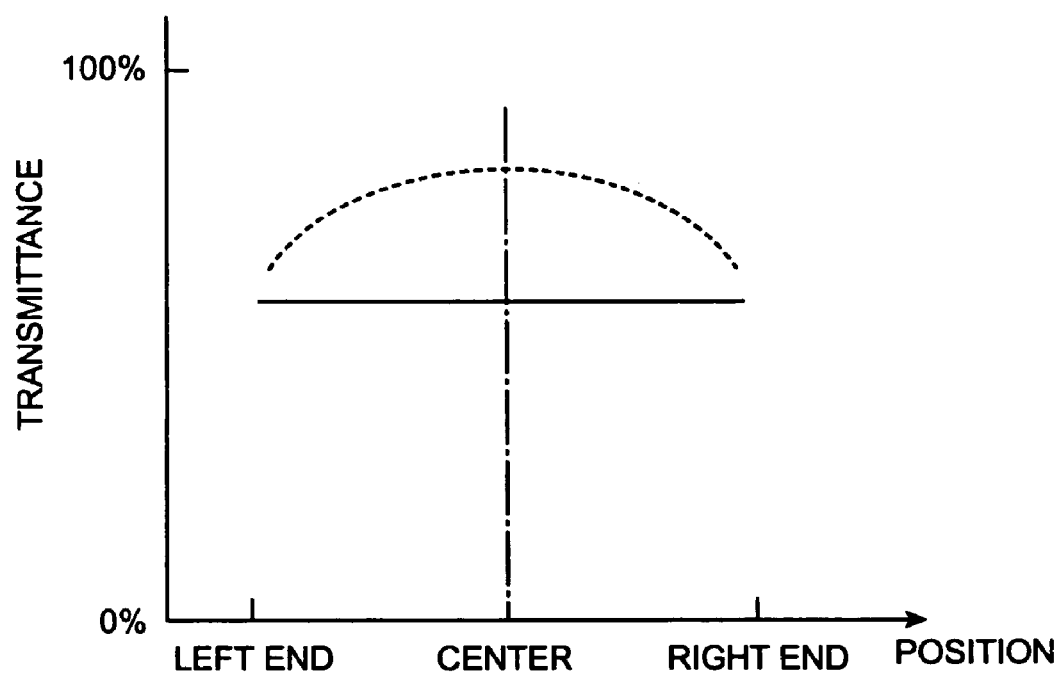
FIG. 6 is a graph to explain a relation of a tilt of the neutral density filter and a luminance distribution.

FIG. 6 is a graph to explain a relation of a tilt of the neutral density filter 31 and a luminance distribution. Referring to the graph, the abscissa is used for positions on the neutral density filter 31, and the ordinate is used for apparent transmittance at respective positions. In a case where the neutral density filter 31 is set perpendicular with respect to the optical axis to eliminate a tilt, as is indicated by a dotted line, transmittance, that is, luminance of a projection image, increases at the center of the screen, and transmittance, that is, luminance of the projection image, decreases at the both ends of the screen. In a case where the neutral density filter 31 is tilted by a minute angle with respect to the optical axis from the perpendicular state, as is indicated by a solid line, transmittance, that is, luminance of a projection image, is made homogeneous at the center and the both ends. In a case where the neutral density filter 31 is tilted by a predetermined angle or greater with respect to the optical axis, it is possible to reduce the likelihood or prevent a phenomenon that illumination light concentrates at the center of the screen and the center of a projection image becomes brighter, specifically, the occurrence of greenish irregularities in color at the center of a projection image.

Table 2 set forth below is a table to explain a change of measured values of transmittance when angles of tilt for a plurality of neutral density filters 31 are set as needed. Herein, "filter 1" and "filter 2" mean that separate filters each having different transmittance are used as the neutral density filter 31. Also, in each filters, rows titled "center", "right end", and "left end" indicate transmittance corresponding to respective positions on the screen.

TABLE 2

Experiment Result by Changing Angle of Tilt of Neutral density filter

| | | 0° | 2° | 4° | 6° | 8° | 10° | 12° | 14° |
|---|---|---|---|---|---|---|---|---|---|
| Filter 1 | Center | 83.9% | 81.6% | 79.3% | 76.5% | 73.7% | 72.8% | 72.5% | 72.0% |
| | Right End | 78.7% | 77.6% | 76.4% | 74.8% | 73.4% | 73.1% | 72.4% | 72.1% |
| | Left End | 79.2% | 77.7% | 76.1% | 74.7% | 73.0% | 72.3% | 72.0% | 71.6% |

TABLE 2-continued

Experiment Result by Changing Angle of Tilt of Neutral density filter

|  |  | 0° | 2° | 4° | 6° | 8° | 10° | 12° | 14° |
|---|---|---|---|---|---|---|---|---|---|
| Filter 2 | Center | 78.9% | 76.2% | 73.4% | 70.7% | 67.9% | 66.6% | 65.2% | 64.7% |
|  | Right End | 74.0% | 72.0% | 69.9% | 68.9% | 67.3% | 67.0% | 65.1% | 64.7% |
|  | Left End | 73.7% | 71.7% | 69.7% | 68.7% | 67.7% | 66.7% | 64.7% | 64.3% |

Figure 7:
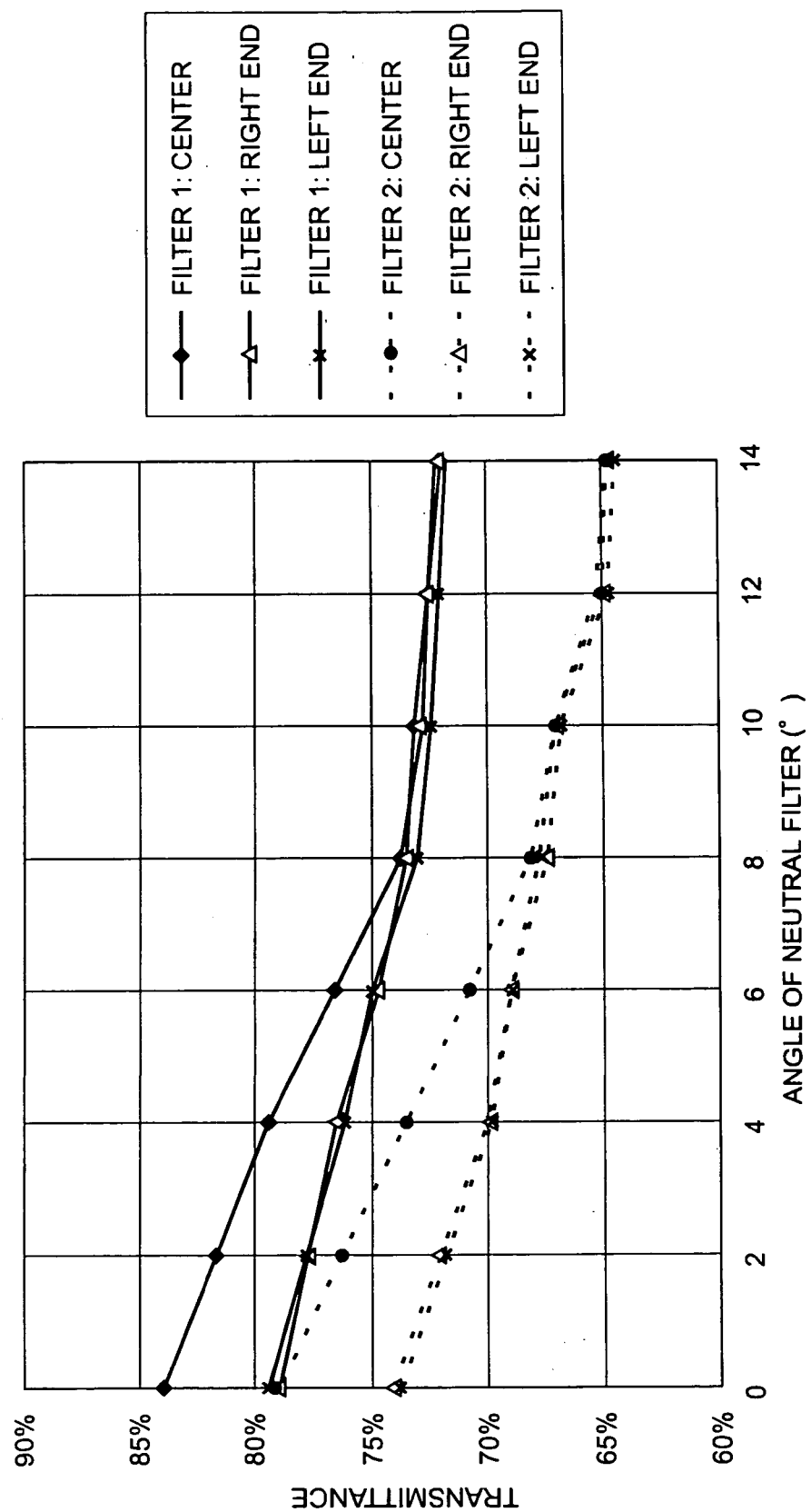
FIG. 7 is a graph showing measured values of transmittance when angles of tilt of a plurality of neutral density filters are set as needed.

FIG. 7 is a graph when the measured values of Table 2 are plotted. Referring to the graph, the abscissa is used for an angle of tilt of the neutral density filter 31, and the ordinate is used for apparent transmittance at respective positions. As is obvious from the graph, it is understood that in either case using "filter 1" or "filter 2", transmittance across the entire surface became almost equal when an angle of tilt of these filters was 8° or greater. In short, it is possible to achieve a homogeneous reduction of light across the entire screen by setting an angle of tilt of the neutral density filter 31 to 8° or greater.

Figure 8:
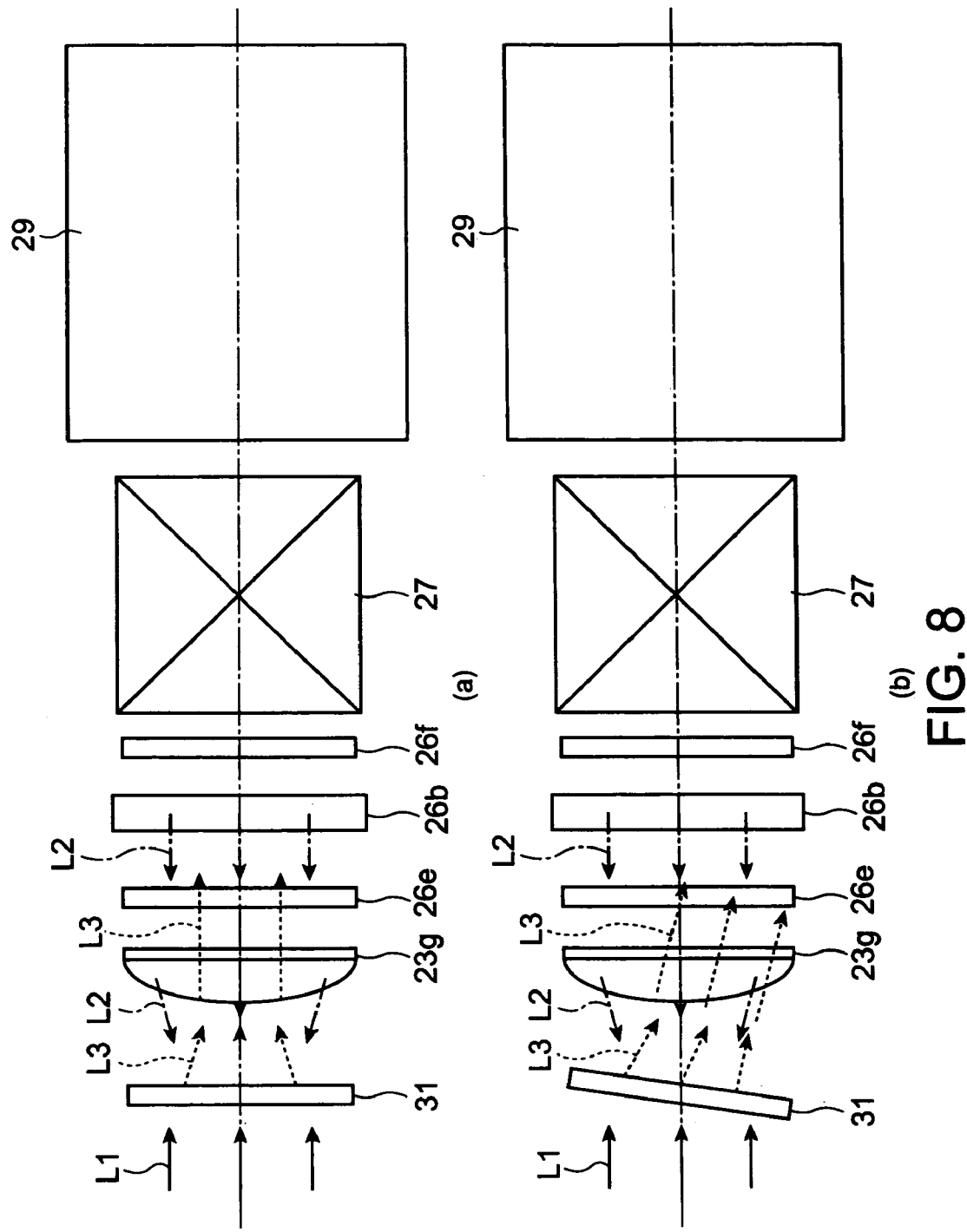
FIG. 8(a) and FIG. 8(b) are schematics showing the relation of a posture of the neutral density filter and a transmittance distribution.

FIGS. 8(a) and (b) are schematics showing the relation of the posture of the neutral density filter 31 and a transmittance distribution. FIG. 8(a) is a schematic to explain an illumination characteristic when the neutral density filter 31 is not tilted at all. FIG. 8(b) is a schematic to explain an illumination characteristic when the neutral density filter 31 is tilted as needed.

As is shown in FIG. 8(a), in a case where the neutral density filter 31 is placed so as to intersect with the optical axis OA at right angles, because the field lens 23f having positive power is placed in the latter stage of the neutral density filter 31 on which initial illumination light L1 goes incident, return light L2, reflected on the liquid crystal light valve 26b, the first polarization filter 26e, etc. as unwanted light, is condensed by the field lens 23f and then goes incident on the neutral density filter 31. The neutral density filter 31 allows stray light L3 to go incident again on the field lens 23f while condensing return light L2 by reflection. A degree of convergence of stray light L3 that goes incident on the field lens 23f is greater than a degree of convergence of the initial illumination light L1. Stray light L3 thus becomes able to illuminate the liquid crystal light valve 26b at a central region alone. Multi-reflection takes place while such phenomena are repeated, which causes illumination at the central region to intensify. Hence, of images of light projected onto an unillustrated screen by means of the projection lens 29 via the cross dichroic prism 27, for an image of G light, luminance is increased at the center of the screen, but light is reduced on the periphery (see a dotted line on the graph of FIG. 6). Of the entire image projected onto the screen, brightness of G is increased at the central portion, which is equivalent to the occurrence of irregularities in color when viewed entirely.

In a case where the neutral density filter 31, intersecting with the optical axis OA at right angles, is titled as is shown in FIG. 8(b), return light L2, reflected on the liquid crystal light valve 26b, the first polarization filter 26e, etc. as unwanted light, is condensed by the field lens 23f and then goes incident on the neutral density filter 31. The neutral density filter 31 reflects the return light L2 to be condensed further. However, because the reflection direction is a direction shifted from the optical axis OA, stray light L3 that comes incident on the field lens 23f gradually deviates from the light path. Hence, of images of light projected onto the unillustrated screen by projection lens 29 via the cross dichroic prism 27, an image of G light has homogeneous brightness across the entire screen (see the solid line of FIG. 6). In short, it is possible to project an image having no irregularities in color across the entire screen.

Operations of the projector 10 according to the first exemplary embodiment will now be described. Light-source light from the light source device 21 is split into beams of light according to colors by the first and second dichroic mirrors 23a and 23b provided in the light division optical system 23. These beams of light go incident on the corresponding liquid crystal light valves 26a through 26c as illumination light. The respective liquid crystal light valves 26a through 26c are modulated by image signals from the outside and have 2-D refractive index distributions, thereby modulating illumination light 2-D spatially pixel by pixel. Beams of illumination light, specifically, images of light, modulated by the respective liquid crystal light valves 26a through 26c are synthesized in the cross dichroic prism 27, and then go incident on the projection lens 29. The images of light that come incident on the projection lens 29 are projected onto the unillustrated screen. In this case, because the neutral density filter 31, of which posture can be fine-adjusted by the posture regulating mechanism 33, is placed in a space between the second dichroic mirror 23b and the liquid crystal light valve 26b, it is possible to remove stray light, which corresponds to condensed light resulted from multi-pass through the field lens 23f or the like, to the outside of the light path in a reliable manner by merely tilting the neutral density filter 31 adequately. It is thus possible to project an image having homogeneous brightness (illuminance at the white level) across the entire screen, which in turn makes it possible to project an image having no irregularities in color across the entire screen.

Second Exemplary Embodiment

A projector according to a second exemplary embodiment is a projector employing a digital mirror device (DMD) including a light-modulating element of a reflective type.

Figure 9:
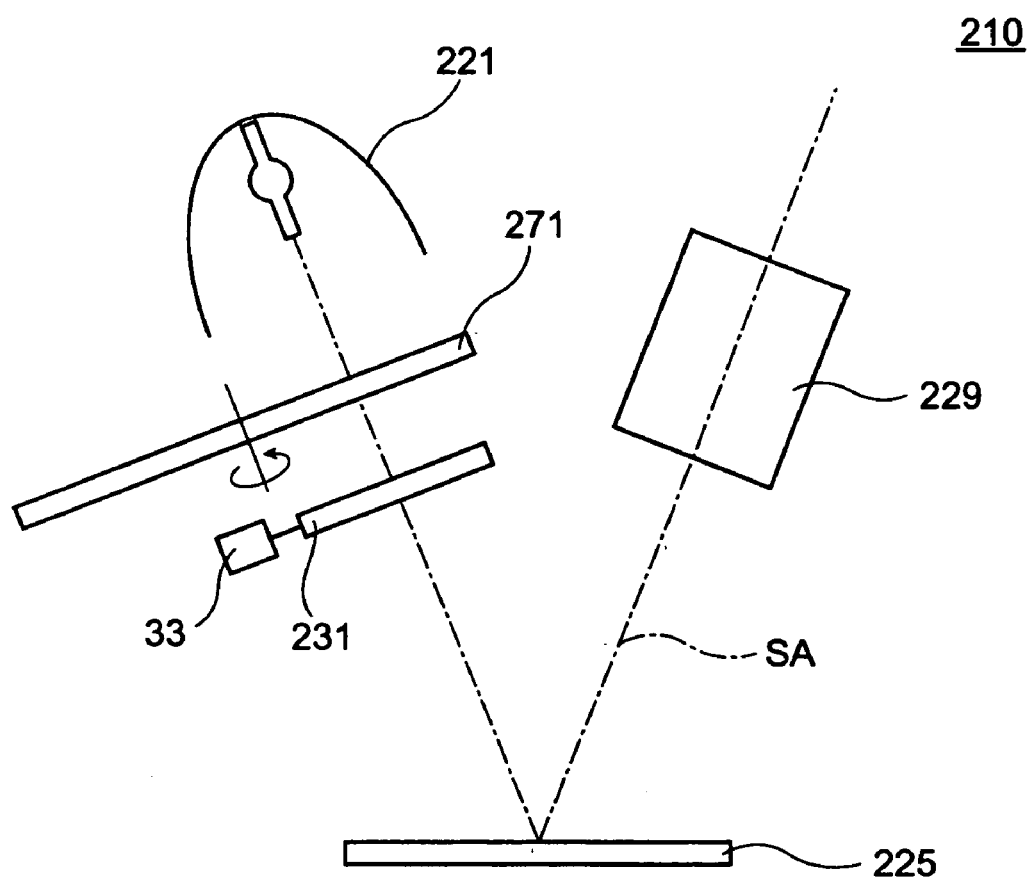
FIG. 9 is a schematic showing the structure of a projector according to a second exemplary embodiment.

FIG. 9 is a schematic showing the optical system of the projector of the second exemplary embodiment. The projector 210 includes a light source device 221, a color wheel 271, a neutral density filter 231, a digital mirror device (DMD) 225, and a projection lens 229, which are placed sequentially along a system optical axis SA.

The light source device 221 includes a light source lamp and a reflector. Light-source light from the light source device 221 goes incident on the color wheel 271 and is split into beams of illumination light of respective colors that switch with time by passing through the color wheel 271, which go incident on the digital mirror device 225 by way of the neutral density filter 231. The digital mirror device 225 is a spatial light-modulating device of a reflection direction control type furnished with a function of emitting image light representing an image in a direction to the projection lens 229, by reflecting incident beams of illumination light of respective colors on micro mirrors corresponding to respective pixels according to image signals.

Image light emitted from the digital mirror device 225 is projected onto a screen (not shown) by the projection lens 229. The neutral density filter 231 is used to adjust color balance and luminance. In the projector described above, the neutral density filter 231 is held by the posture regulating mechanism 33 in a state tilted by a minute angle with respect to the system optical axis SA. It is thus possible to release stray light that causes irregularities in color to the outside of the light path.

While the invention has been described by way of exemplary embodiments, it should be appreciated that the invention is not limited to the exemplary embodiments above. For example, in the first exemplary embodiment, the position of the neutral density filter 31 is not limited to somewhere between the second dichroic mirror 23b and the liquid crystal light valve 26b, and can be somewhere between the first dichroic mirror 23a and the second dichroic mirror 23b or somewhere between the first dichroic mirror 23a and the light source device 21. Also, the neutral density filter 31 can be placed not only in a space between the second dichroic mirror 23b and the liquid crystal light valve 26b, but also in the preceding stages of the other liquid crystal light valves 26a and 26c.

Also, the projector 10 may be configured in such a manner that light-source light from a white light source is condensed by a mirror or the like to go incident on the light incident end of a rod integrator in obtaining homogeneous illumination light at the light emission end of the rod integrator, so that a single liquid crystal light valve of a color display type, placed oppositely to the light emission end of the rod integrator, is directly illuminated by the illumination light thus obtained. In this case, too, it is possible to project an image having homogenous brightness in all the portions while reducing the likelihood or preventing the occurrence of irregularities in color, by incorporating the neutral density filter 31 and the posture regulating mechanism 33 of the exemplary embodiment above.

What is claimed is:

1. A projector, comprising:
an illuminating device to emit illumination light;
a light modulating device illuminated by the illumination light from the illuminating device;
a projection optical system to project an image of light from the light modulating device;
a neutral density filter of a reflective type, placed in a preceding stage of the light modulating device, to attenuate intensity of the illumination light that goes incident on the light modulating device;
a holding device to hold the neutral density filter with a tilt of a certain angle with respect to an optical axis; and
the holding device includes an adjusting device to adjust an angle of tilt of the neutral density filter with respect to the optical axis.

2. The projector according to claim 1:
the neutral density filter being of a plate shape.

3. The projector according to claim 1:
an angle of tilt of the neutral density filter with respect to the optical axis being 80° or greater.

4. The projector according to claim 1, further comprising:
a field lens, placed in a preceding stage of the light modulating device, to regulate an angle of incidence of the illumination light on the light modulating device,
the neutral density filter being placed in a preceding stage of the field lens.

5. The projector according to claim 1:
the neutral density filter being rotatable about an axis perpendicular to the optical axis as the axis or rotation.

6. A projector, comprising:
an illuminating device to emit beams of illumination light of respective colors;
light modulating devices of respective colors illuminated by the beams of illumination light of respective colors;
a light synthesizing member to synthesize images of light of respective colors from the light modulating devices of respective colors to be emitted;
a projection optical system to project the images of light having passed through the light synthesizing member;
a neutral density filter of a reflective type, placed in a preceding stage of at least one of the light modulating devices of respective colors, to attenuate intensity of the illumination light that goes incident on the at least one light modulating device;
a holding device to hold the neutral density filter with a tilt of a certain angle with respect to an optical; and
the holding device includes an adjusting device to adjust an angle of tilt of the neutral density filter with respect to the optical axis.

7. The projector according to claim 6, further comprising:
field lenses, respectively placed in preceding stages of the light modulating devices of respective colors, to regulate an angle of incidence of the illumination light on each of the light modulating devices,
the neutral density filter being placed in a preceding stage of at least one of the field lenses.

8. The projector according to claim 6:
the neutral density filter being of a plate shape.

9. The projector according to claim 6:
an angle of tilt of the neutral density filter with respect to the optical axis being 80° or greater.

10. The projector according to claim 6:
the neutral density filter being rotatable about an axis perpendicular to the optical axis as the axis or rotation.

11. A projector, comprising:
an illuminating device to emit illumination light;
a light modulating device illuminated by the illumination light from the illuminating device;
a projection optical system to project an image of light from the light modulating device;
a neutral density filter of a reflective type, placed in a preceding stage of the light modulating device, to attenuate intensity of the illumination light that goes incident on the light modulating device
a holding device to hold the neutral density filter with a tilt of a certain angle with respect to an optical axis; and
a field lens, placed in a preceding stage of the light modulating device, to regulate an angle of incidence of the illumination light on the light modulating device,
the neutral density filter being placed in a preceding stage of the field lens.

12. The projector according to claim 11:
the neutral density filter being of a plate shape.

13. The projector according to claim 11:
an angle of tilt of the neutral density filter with respect to the optical axis being 80° or greater.

14. The projector according to claim 11:
the neutral density filter rotates about an axis perpendicular to the optical axis as the axis or rotation.

* * * * *